United States Patent
Fessler-Knobel et al.

(10) Patent No.: US 8,813,327 B2
(45) Date of Patent: Aug. 26, 2014

(54) METHOD FOR MACHINING WORKPIECES

(75) Inventors: Martin Fessler-Knobel, Munich (DE);
Roland Huttner, Jesenwang (DE);
Robert Axtner, Erdweg (DE)

(73) Assignee: MTU Aero Engines GmbH, Munich (DE)

( * ) Notice: Subject to any disclaimer, the term of this patent is extended or adjusted under 35 U.S.C. 154(b) by 95 days.

(21) Appl. No.: 13/257,375

(22) PCT Filed: Mar. 19, 2010

(86) PCT No.: PCT/DE2010/000308
§ 371 (c)(1),
(2), (4) Date: Sep. 19, 2011

(87) PCT Pub. No.: WO2010/105612
PCT Pub. Date: Sep. 23, 2010

(65) Prior Publication Data
US 2012/0011703 A1    Jan. 19, 2012

(30) Foreign Application Priority Data
Mar. 20, 2009  (DE) .......................... 10 2009 013 726

(51) Int. Cl.
*B25B 27/14*    (2006.01)

(52) U.S. Cl.
USPC ........................................ 29/281.1; 29/281.6

(58) Field of Classification Search
USPC ............ 29/281.1–281.4, 889–889.722, 281.6
See application file for complete search history.

(56) References Cited

U.S. PATENT DOCUMENTS

| 7,722,320 | B2 * | 5/2010 | Matsumoto et al. .......... 415/191 |
| 2002/0049028 | A1 | 4/2002 | Council, Jr. et al. |
| 2006/0109249 | A1 | 5/2005 | Shen et al. |
| 2007/0221328 | A1 | 9/2007 | DeMeter et al. |

FOREIGN PATENT DOCUMENTS

| DE | 39 35 125 A1 | 4/1991 |
| DE | 10 2007 011 729 A1 | 9/2008 |
| JP | 53-068480 A | 6/1978 |
| JP | 2008-229774 A | 10/2008 |

OTHER PUBLICATIONS

PCT/DE2010/000308 PCT/ISA/210, dated Jul. 29, 2010, 3 pages total.

* cited by examiner

*Primary Examiner* — Richard Chang
(74) *Attorney, Agent, or Firm* — Crowell & Moring LLP

(57) ABSTRACT

A method for machining a workpiece is disclosed. The method includes fixing a workpiece on a workpiece carrier using an engaging and fixing element by adhering a first mold surface of the engaging and fixing element to an adhesive surface of the workpiece and by adhering a second mold surface of the engaging and fixing element to a contact and adhesive surface of the workpiece carrier. The method further includes machining the workpiece and releasing the first mold surface of the engaging and fixing element from the adhesive surface of the workpiece and releasing the second mold surface of the engaging and fixing element from the contact and adhesive surface of the workpiece carrier.

8 Claims, 3 Drawing Sheets

METHOD FOR MACHINING WORKPIECES

This application claims the priority of International Application No. PCT/DE2010/000308, filed Mar. 19, 2010, and German Patent Document No. 10 2009 013 726.2, filed Mar. 20, 2009, the disclosures of which are expressly incorporated by reference herein.

BACKGROUND AND SUMMARY OF THE INVENTION

The present invention relates to a device for fixing at least one workpiece on at least one workpiece carrier having at least one engaging and fixing element designed as a mold for releasable arrangement between the workpiece and the workpiece carrier, wherein at least one first mold surface is designed for receiving a first volume of adhesive and for fixing an adhesive surface of the workpiece to the engaging and fixing element. The invention further relates to a method for machining workpieces.

Devices for fixing workpieces on a workpiece carrier are known. Thus, German Patent Document No. DE 39 35 125 A1 describes a flexible mechanical holding device for positioning and fixing workpieces. The holding device in this case includes holding elements, which can be positioned to be fixed and fastened, in particular these holding elements can be attached and positioned on holding rails so that they are releasable. The workpiece to be processed is held by the holding elements in cooperation with the holding rails and/or a support frame or even by the holding rails alone or in cooperation with the support frame. In addition, adhering the so-called engaging elements directly to the workpiece is known. The engaging elements are arranged to be displaceable in a guide with respect to a workpiece carrier. They may be fixed in the appropriate position on the workpiece carrier via a screw.

The disadvantage of the known devices, however, is that the described guides are structurally complex and also have a high weight. In addition, attaching as well as releasing the engaging elements in the guide of the workpiece carrier is time-consuming and requires a high level of manual effort.

Therefore, the object of the present invention is making available a device for fixing at least one workpiece on at least one workpiece carrier of the type cited at the outset, which guarantees a quick and simple fixing of the workpiece on the workpiece carrier as well as an equally simple and quick separation of these elements from each other.

It is further the object of the present invention to make available a method for machining workpieces, in which a quick and simple fixing of the workpiece on the workpiece carrier is guaranteed as well as an equally simple and quick separation of these elements from each other.

Advantageous embodiments with expedient further developments of the invention are disclosed in the respective dependent claims, wherein advantageous embodiments of the device must be viewed, where appropriate, as advantageous embodiments of the method and vice versa.

A device according to the invention for fixing at least one workpiece on at least one workpiece carrier has at least one engaging and fixing element designed as a mold for releasable arrangement between the workpiece and the workpiece carrier, wherein at least one first mold surface is designed for receiving a first volume of adhesive and for fixing an adhesive surface of the workpiece to the engaging and fixing element and at least one second mold surface of the engaging and fixing element is designed for receiving a second volume of adhesive and for fixing a contact and adhesive surface of the workpiece carrier to the engaging and fixing element. The device according to the invention makes a simple connection between the workpiece carrier and the workpiece possible with the aid of the engaging and fixing element. The connection can be accomplished without a complicated manual effort for the user. In addition, the engaging and fixing element may readily be removed from the workpiece and the workpiece carrier by means of a tool, for example by torsion, namely removing by a turning and/or a breaking off the engaging and fixing element. In addition, the device according to the invention has a higher structural flexibility, because the workpiece and the workpiece carrier may be positioned relative to each other without taking possible guides on the workpiece carrier into consideration, and it also avoids a jamming of these guides, something that arises again and again in the case of known workpiece carriers that have guides. In addition, it is possible, in the case of different shapes or inclinations of adhesive surfaces of the workpiece in the region of the respective adhesion site, for the engaging and fixing elements to be positioned with respect to the relevant workpiece surface via a corresponding inclination or shaping of the first mold surface or even via a corresponding shaping or inclination of the contact and adhesive surface of the workpiece carrier.

In further advantageous embodiments of the device according to the invention, the engaging and fixing element is designed to be polyhedral, in particular block-shaped, cubic, pyramidal or prism-shaped. In addition, the first mold surface may be designed to be adjacent to the second mold surface. This type of embodiment makes it possible for the device according to the invention to be used in numerous ways. In this case, all engaging and fixing elements that belong to a specific workpiece carrier are designed to be the same.

In another advantageous embodiment of the device according to the invention, the device includes first and/or second spacing elements for forming a gap between the first mold surface and the workpiece and/or between the second mold surface and the workpiece carrier. As a result, adhesives that only require a minimal gap between the substrates may also be used advantageously.

In another advantageous embodiment of the device according to the invention, the engaging and fixing element is designed to be transparent or translucent. As a result, adhesives that cure via light may also be used advantageously.

In further advantageous embodiments of the device according to the invention, the engaging and fixing element includes at least one positioning device for correct positioning on the workpiece carrier and/or the workpiece. In doing so, the positioning device includes at least one first magnetic element, wherein the first magnetic element is magnetically adherable for positioning on at least one second magnetic element, which is configured in the region of the contact and adhesive surface of the workpiece carrier. This guarantees that the engaging and fixing element is always positioned with its second mold surface on the contact and adhesive surface of the workpiece carrier. An incorrect positioning of the engaging and fixing element, for example with its first mold surface on the contact and adhesive surface of the workpiece carrier, is reliably prevented. In addition, with an appropriate positioning of the two magnetic elements relative to each other, a transverse force may also be generated, wherein it may also serve to press the engaging and fixing element on the workpiece. In this manner, a slipping of the engaging and fixing element may be prevented advantageously, in particular at a point in time when the adhesive connection had not cured yet. However, it is also possible for the engaging and fixing element to have at least one holding device for holding the workpiece and/or the workpiece carrier. The holding device in this case may be designed to be mechanical and/or as a vacuum unit. Mechanical holding devices may be designed to be clamp-like for example.

In another advantageous embodiment of the device according to the invention, the engaging and fixing element has at least one opening running approximately perpendicular to the second mold half for receiving a screw or lever element. These types of screw or lever elements make it easier to release the engaging or fixing element from the workpiece carrier. The opening features an internal screw thread for the use of screw elements. By means of an appropriate insertion of the screw or lever element into the opening and a corresponding initiation of force or momentum, the adhesive connection between the engaging and fixing element and the workpiece carrier releases. However, it is also conceivable for a corresponding release mechanism to be used to release the engaging and fixing element from the workpiece. In addition, the mold of the engaging and fixing element is basically formed such that it may be moved, in particular rotated, with simple mechanical accessories, for example an open-end wrench, so that the corresponding adhesive connections are released.

In another advantageous embodiment of the device according to the invention, the first volume of adhesive and/or the second volume of adhesive is/are designed as an adhesive bead and/or adhesive film. The embodiment of the engaging and fixing element as a mold advantageously permits the application of different forms of adhesives. In particular, polymerizable plastic adhesives are used as adhesives.

In another advantageous embodiment of the device according to the invention, the workpiece is a component of a gas turbine.

A method according to the invention for machining workpieces includes the following steps: a) Making at least one workpiece carrier available; b) Fixing the at least one workpiece on the workpiece carrier using a device having at least one engaging and fixing element designed as a mold for releasable arrangement between the workpiece and the workpiece carrier, wherein at least one first mold surface of the engaging and fixing element is adhered to an adhesive surface of the workpiece and at least one second mold surface of the engaging and fixing element is adhered to a contact and adhesive surface of the workpiece carrier; c) Machining the workpiece; and d) Releasing the adhesive connections between the engaging and fixing element and the workpiece as well as the workpiece carrier. With the method according to the invention, it is possible to advantageously dispense with the conventional connection of engaging and fixing elements in a guide of the workpiece carrier. On the one hand, a quick and simple fixing of the workpiece on the workpiece carrier is therewith guaranteed and, on the other hand, an equally simple and quick separation of these elements from one another is guaranteed. For the releasable fixing of the workpiece on the workpiece carrier, merely at least two sides of the engaging and fixing element must be provided with adhesive. Then the executing person may adhere them at the desired position on the workpiece and the workpiece carrier. After the machining, the engaging and fixing elements may readily be removed from the workpiece and the workpiece carrier, for example with the aid of a simple tool like an open-end wrench or a lever instrument, in particular by torsion, such as, for example, by turning and/or breaking off.

In another advantageous embodiment of the method according to the invention, a device like the one that has been described in the foregoing is used. As a result, it is possible, among other things, that prior to or during the fixing of the workpiece, a correct positioning of the engaging and fixing element on the workpiece carrier and/or the workpiece is carried out by means of at least one positioning device. In doing so, the positioning device may be made for example of two magnetic elements that are operatively connected, wherein a first magnetic element is arranged on the engaging and fixing element, in particular in the region of the second mold surface, and a second magnetic element is arranged in the region of the contact and adhesive surface of the workpiece carrier. As a result, the correct side of the engaging and fixing element, namely the second mold surface, is pulled with exact positioning onto the corresponding side of the workpiece carrier, namely onto the contact and adhesive surface. In addition, with the corresponding positioning of the two magnetic elements relative to each other, a transverse force may be generated. This may also serve to press the engaging and fixing element on the workpiece. In this way, a slipping is prevented as long as the adhesive connection has not cured.

In another advantageous embodiment of the method according to the invention, prior to or during the fixing of the workpiece, a holding of the engaging and fixing element on the workpiece and/or the workpiece carrier is carried out by means of at least one holding device. This holding device also reliably prevents a slipping or shifting of the engaging and fixing element from the workpiece carrier and/or the workpiece, in particular at a point in time when the adhesive connections have not cured yet.

In another advantageous embodiment of the method according to the invention, the releasing of the engaging and fixing element from the workpiece carrier and the workpiece in accordance with process step d) is carried out by means of mechanical accessories. In doing so, the mold of the engaging and fixing element is designed such that same may readily be removed from the workpiece carrier and the workpiece using simple tools, such as, for example, an open-end wrench or a lever-like tool, in particular by torsion, such as, for example, a turning and breaking off.

In another advantageous embodiment of the method according to the invention, after the process step d), a cleaning of the engaging and fixing element is carried out, in particular a cleaning by means of a blasting method. In this case, a plurality of engaging and fixing elements may be arranged in at least one receiving device prior to the cleaning. The method according to the invention permits a simple cleaning of the engaging and fixing elements, because in this case only the engaging and fixing elements and not the entire workpiece carrier must be cleaned. In addition, there aren't any guides on the workpiece carrier that are gummed up with adhesive that are time-consuming and difficult to clean. Because of a possible arrangement of a plurality of engaging and fixing elements in a receiving device, the cleaning may be carried out effectively and quickly. In doing so, a blasting agent may be irradiated via a nozzle at a suitable angle on the appropriate mold surfaces of the engaging and fixing elements so that adhesive residues adhering to these surfaces may be removed reliably.

In another advantageous embodiment of the method according to the invention, the workpiece is a component of a gas turbine.

Additional advantages, features and details of invention are yielded from the following description of several graphically depicted exemplary embodiments.

DETAILED DESCRIPTION OF THE DRAWINGS

Figure 1:
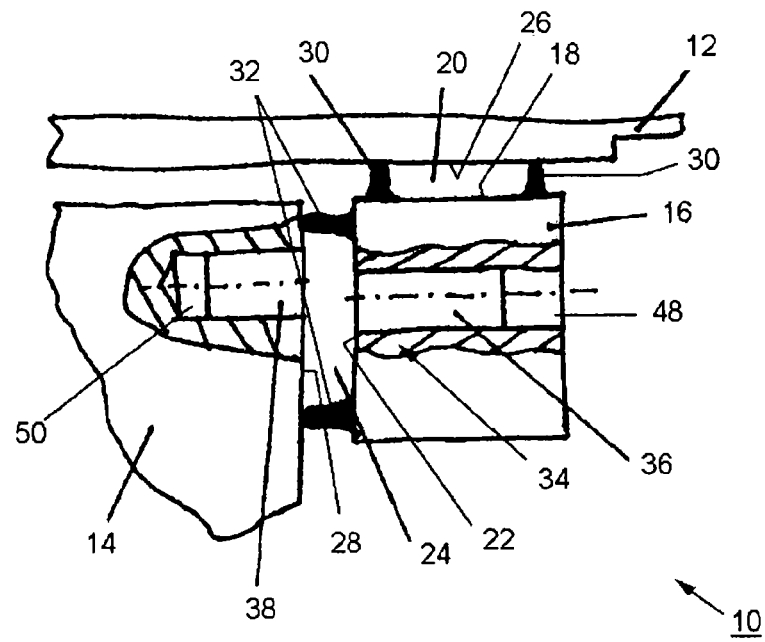
FIG. 1 is a schematic representation of a device according to the invention in accordance with a first embodiment.

FIG. 1 shows a schematic representation of a device 10 for fixing a workpiece 12 on a workpiece carrier 14 in accordance with a first embodiment. One can see that the device 10 has at least one engaging and fixing element 16 designed as a block-shaped mold for releasable arrangement between the workpiece 12 and the workpiece carrier 14. In this case, a first mold surface 18 is designed for receiving a first volume of adhesive 20 and for fixing an adhesive surface 26 of the workpiece 12 to the engaging and fixing element 16. In addition, one can see that a second mold surface 22, which is designed to be adjacent to the first mold surface 18, is present for receiving a second volume of adhesive 24 and for fixing a contact and adhesive surface 28 of the workpiece carrier 14 to the engaging and fixing element 16. The engaging and fixing element 16 in the depicted exemplary embodiment is designed to be block-shaped. But other polyhedral shapes, such as, for example, cubes, pyramids or prisms may also form the shape of the engaging and fixing element 16.

In the depicted exemplary embodiment, the device 10 also has first and second spacing elements 30, 32 for forming a respective gap between the first mold surface 18 and the workpiece 12, on the one hand, and between the second mold surface 22 and the carrier 14, on the other. The engaging and fixing element 16 also has a positioning device 34 for correct positioning on the workpiece carrier 14. One can see that the positioning device 34 in this case has a first magnetic element 36, wherein the first magnetic element 36 is designed to be magnetically adherable for positioning on a second magnetic element 38, which is configured in the region of the contact and adhesive surface 28 of the workpiece carrier 14. In the depicted exemplary embodiment, the first magnetic element 36 is arranged in the engaging and fixing element 16 in a corresponding borehole 48. The longitudinal axis of the borehole 48 runs in this case approximately perpendicular to the second mold surface 22. The second magnetic element 38 is arranged in a borehole 50 in the workpiece carrier 14. The longitudinal axis of the borehole 50 in this case runs approximately perpendicular to the contact and adhesive surface 28 of the workpiece carrier 14.

For the machining of the workpiece 12, the workpiece carrier 14 is made available to begin with. Then a fixing of the workpiece 12 on the workpiece carrier 14 is carried out using the device 10 with the block-shaped engaging and fixing element 16. In the process, the first and second mold surface 18, 22 of the engaging and fixing element 16 are each provided with adhesive and then adhered to the workpiece 12, on the one hand, and to the workpiece carrier 14, on the other hand. In the depicted embodiment, the two volumes of adhesive 20, 24 are designed as adhesive beads. However, it is also possible for the volumes of adhesive 20, 24 to be arranged on the first and second mold surface 18, 22 as an adhesive film. After fixing the workpiece 12 on the workpiece carrier 14 via an appropriate number of engaging and fixing elements 16, the desired machining of the workpiece 12 is carried out. After machining, the adhesive connections between the engaging and fixing element 16 and the workpiece 12, on the one hand, as well as the workpiece carrier 14, on the other hand, are released.

Figure 2:
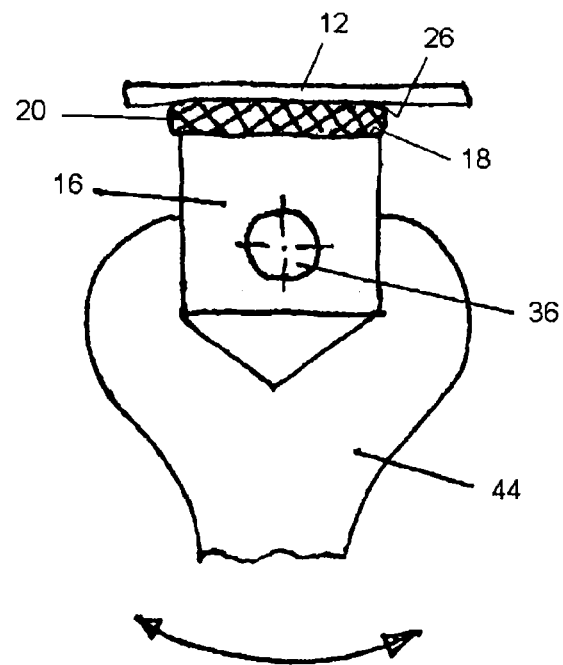
FIG. 2 is a schematic representation of a releasing process of a device according to the invention in accordance with a second embodiment.
Figure 3:
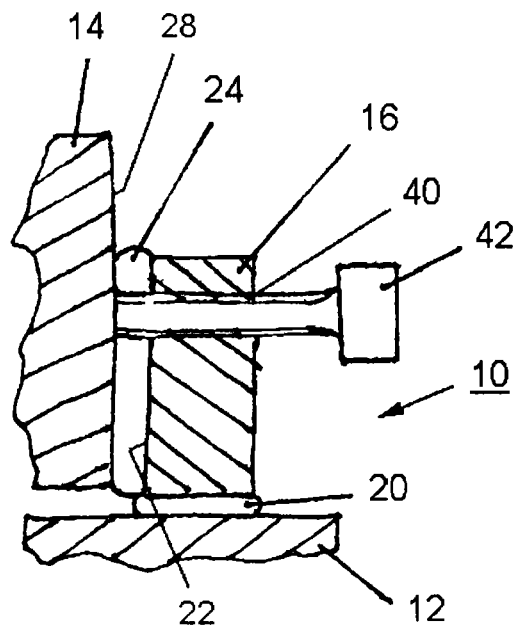
FIG. 3 is a schematic representation of a device according to the invention in accordance with a third embodiment.

FIGS. 2 to 5 each depict different embodiments of the device 10. In addition, different release types and release processes are depicted schematically. Thus, FIG. 2 shows an open-end wrench 44 which grips around a block-shaped or cubic engaging and fixing element 16 on two sides, wherein these are mold surfaces that are not coated with adhesive. By operating the open-end wrench 44, in particular by turning the open-end wrench 44 (see double arrow), the engaging and fixing element 16 is released from the workpiece 12 or its adhesive surface 26 as well as from the workpiece carrier 14 (not shown) through torsion. The device 10 shown schematically in FIG. 3 includes an engaging and fixing element 16 with a borehole 40 running approximately perpendicular to second mold surface 22. The borehole 40 in this case has an internal screw thread into which a screw-like element 42 can be screwed. The length of the screw-like element 42 is selected in the process in such a way that the end of the element 42 opposite from the screw head can engage during a turning of the element 42 on the contact and adhesive surface 28 of the workpiece carrier 14 so that with an additional turning of the element 42, the engaging and fixing element 16 is released from the workpiece carrier 14, on the one hand, and from the workpiece 12, on the other hand, by a tilt-like motion.

Figure 4:
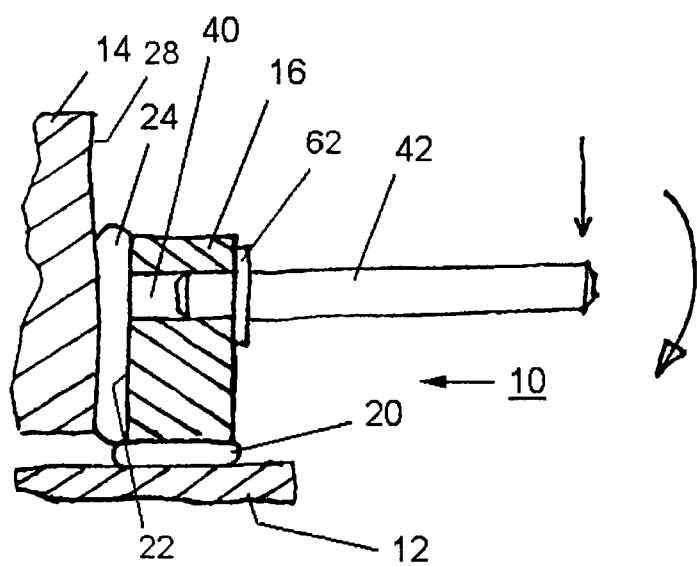
FIG. 4 is a schematic representation of a device according to the invention in accordance with a fourth embodiment.

FIG. 4 shows another embodiment of the device 10, wherein the engaging and fixing element 16 has in turn a continuous borehole 40 running approximately perpendicular to the second mold surface 22. In this exemplary embodiment, the borehole 40 is provided with a thread and serves to engage a rod-like lever element 42. In this case, the element 42 has a collar 62 in the insertion direction, which fits against a mold surface of the engaging and fixing element 16. By tilting or swiveling (see directional arrows) the element 42, the engaging and fixing element 16 is released from the workpiece carrier 14, on the one hand, and from the workpiece 12, on the other hand.

Figure 5:
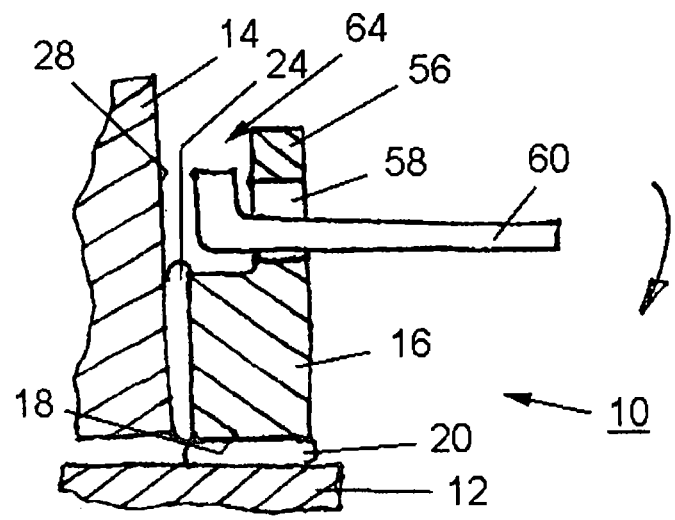
FIG. 5 is a schematic representation of a device according to the invention in accordance with a fifth embodiment.

FIG. 5 shows a schematic representation of another embodiment of the device 10 including the engaging and fixing element 16. In the depicted exemplary embodiment, the engaging and fixing element 16 has a projection 56 with a continuous borehole 58 on a mold surface opposite from the first mold surface 18. An intermediate space 64 is formed by the projection 56 between the projection 56 and the contact and adhesive surface 28 of the workpiece carrier 14. Because of the opening 58, a hook-shaped lever element 60 can be inserted into the intermediate space 64. By operating the lever element 60, for example by tilting the lever element 60 (see directional arrow in FIG. 5), the engaging and fixing element 16 may be released in turn from the workpiece carrier 14 and the workpiece 12.

Figure 6:
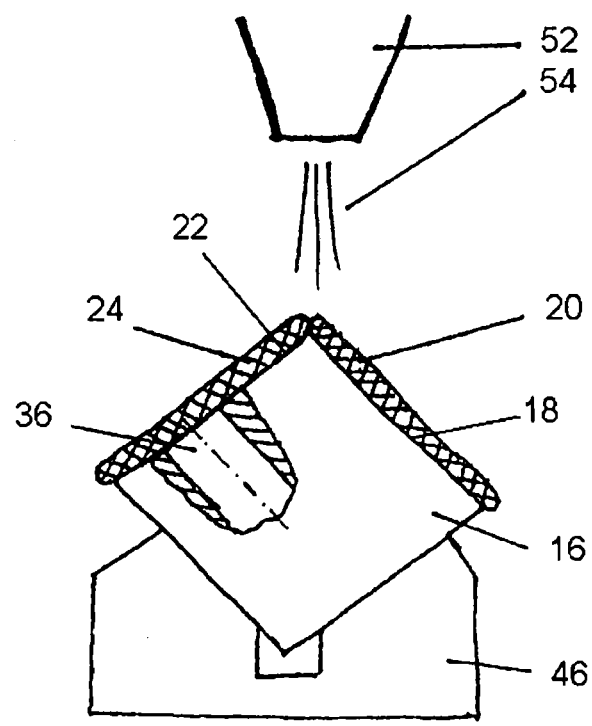
FIG. 6 is a schematic representation of a cleaning process of a device according to the invention.

FIG. 6 shows a schematic representation of a cleaning process of the device 10 with the engaging and fixing element 16. One can see that the engaging and fixing element 16 is arranged in a receiving device 46. The arrangement in this case is such that the first and second mold surfaces 18, 22 are aligned with the volumes of adhesive 20, 24 in the direction of a nozzle 52. A blasting agent 54 is emitted via the nozzle 52 in the direction of the volumes of adhesive 20, 24 so that same can be removed from the mold surfaces 18, 22 without leaving a residue.

The workpiece 12 mentioned in the foregoing exemplary embodiments may be a component of a gas turbine. Polymerizable plastic adhesives, for example, may be used as adhesives.

The invention claimed is:

1. A method for machining a workpiece, comprising the steps of:
    fixing the workpiece on a workpiece carrier using an engaging and fixing element by adhering a first mold surface of the engaging and fixing element to an adhesive surface of the workpiece and by adhering a second mold surface of the engaging and fixing element to a contact and adhesive surface of the workpiece carrier;
    positioning the engaging and fixing element on the workpiece carrier and/or the workpiece by a positioning device prior to or during the step of fixing the workpiece on the workpiece carrier;
    machining the workpiece; and
    releasing the first mold surface of the engaging and fixing element from the adhesive surface of the workpiece and releasing the second mold surface of the engaging and fixing element from the contact and adhesive surface of the workpiece carrier.

2. The method according to claim 1, further comprising a step of holding the engaging and fixing element on the workpiece carrier and/or the workpiece by a holding device prior to or during the step of fixing the workpiece on the workpiece carrier.

3. The method according to claim 1, wherein the steps of releasing are carried out by mechanical accessories.

4. The method according to claim 1, further comprising a step of cleaning the engaging and fixing element by a blasting method after the steps of releasing.

5. The method according to claim 1, wherein the workpiece is a component of a gas turbine.

6. The method according to claim 1, wherein the engaging and fixing element defines a borehole, wherein the positioning device includes a magnetic element, and wherein the magnetic element is disposed within the borehole.

7. The method according to claim 1, further comprising steps of:
    forming a first gap between the first mold surface of the engaging and fixing element and the adhesive surface of the workpiece by a first spacing element disposed between the first mold surface of the engaging and fixing element and the adhesive surface of the workpiece; and
    forming a second gap between the second mold surface of the engaging and fixing element and the contact and adhesive surface of the workpiece carrier by a second spacing element disposed between the second mold surface of the engaging and fixing element and the contact and adhesive surface of the workpiece carrier.

8. The method according to claim 7, further comprising steps of:
    providing a first volume of adhesive in the first gap between the first mold surface of the engaging and fixing element and the adhesive surface of the workpiece; and
    providing a second volume of adhesive in the second gap between the second mold surface of the engaging and fixing element and the contact and adhesive surface of the workpiece carrier.

* * * * *